US012771029B2

(12) United States Patent
McCormick

(10) Patent No.: US 12,771,029 B2
(45) Date of Patent: Oct. 20, 2026

(54) HIGH GAIN PLANAR DIPOLE ANTENNA WITH DECADE GAIN-BANDWIDTH

(71) Applicant: U.S. Army DEVCOM, Army Research Laboratory, Adelphi, MD (US)

(72) Inventor: Seth A. McCormick, Herndon, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 69 days.

(21) Appl. No.: 18/776,948

(22) Filed: Jul. 18, 2024

(65) Prior Publication Data

US 2026/0024915 A1 Jan. 22, 2026

(51) Int. Cl.
*H01Q 5/15* (2015.01)
*H01Q 5/48* (2015.01)
*H01Q 21/06* (2006.01)

(52) U.S. Cl.
CPC ............. *H01Q 5/48* (2015.01); *H01Q 21/062* (2013.01)

(58) Field of Classification Search
CPC .. H01Q 1/36; H01Q 5/48; H01Q 5/50; H01Q 9/065; H01Q 21/062; H01Q 31/062; H01Q 31/067; H01Q 31/068; H01Q 9/285; H01Q 1/38; H01Q 9/0457; H01Q 5/58
See application file for complete search history.

(56) References Cited

U.S. PATENT DOCUMENTS

| | | | | |
|---|---|---|---|---|
| 6,320,548 B1 * | 11/2001 | Harrell | H01Q 9/28 | 343/770 |
| 6,417,816 B2 * | 7/2002 | Sadler | H01Q 1/38 | 343/702 |
| 7,619,565 B2 | 11/2009 | Chen et al. | | |
| 2020/0058999 A1 * | 2/2020 | Lamminen | H01Q 5/49 | |
| 2021/0288408 A1 * | 9/2021 | Rogers | H01Q 1/48 | |

* cited by examiner

*Primary Examiner* — Dimary S Lopez Cruz
*Assistant Examiner* — Marin Stoytchev Stoytchev
(74) *Attorney, Agent, or Firm* — Eric B. Compton

(57) ABSTRACT

Disclosed is a novel dipole antenna design having symmetric poles, each pole having a half circle resonator and an oval resonator that are electrically connected by a straight choke section; the dipole shape permits a wideband dipole response with a transition frequency between a lower and upper frequency band. A cross bar and capacitively-coupled stubs tune at the transition frequency to create a continuous impedance and gain-bandwidth. The dipole and the crossbar and stubs are formed on opposite surface or sides of a substate. Data demonstrates the novel dipole antenna can exceed the gain-bandwidth of the state-of-the-art bowtie by approximately 5 times, that is, its gain-bandwidth is 10:1 versus the standard bowtie gain-bandwidth of 2:1 at broadside.

20 Claims, 16 Drawing Sheets

At 1.8GHz

At 7.2GHz

At 9 GHz

At 14.4GHz

At 1.8GHz

At 7.2GHz

At 9GHz

At 14.4GHz

HIGH GAIN PLANAR DIPOLE ANTENNA WITH DECADE GAIN-BANDWIDTH

GOVERNMENT INTEREST

The invention described herein may be manufactured, used and licensed by or for the U.S. Government without the payment of royalties thereon.

BACKGROUND OF THE INVENTION

Field

Embodiments of the present invention are directed to antennas and in particular to a high gain planar dipole antenna with decade gain bandwidths.

Description of Related Art

A dipole antenna is a canonical antenna and can be designed to function as a narrowband or a wideband antenna. The most wideband planar dipole today is the bowtie dipole which has a typical impedance bandwidth, defined by its voltage standing wave ratio (VSWR) being less than 2, ratio of 4:1 (e.g., the crossing points for the VSWR versus frequency are frequencies $f_1$ and $f_2$ whose ratio $f_2/f_1$ is 4:1). Bowtie dipole antennas are often used for wideband applications given their omni-directional radiation pattern and backed by a ground plane for directional applications; however, the gain-bandwidth, defined as the bandwidth over which the gain remains continuously greater than some value, falls apart after the first octave leaving the last octave of the 4:1 impedance bandwidth limited in its directional application.

Thus, improvements for a high gain planar dipole antenna are desired.

BRIEF SUMMARY OF THE INVENTION

I provide a novel wideband planar dipole with high gain planar dipole antenna with decade gain bandwidth. This novel antenna has five times the gain-bandwidth compared to the standard wideband planar bowtie dipole.

According to an embodiment, a high gain planar dipole antenna with decade gain-bandwidth includes a substate having a front surface and a rear surface. The front surface has a dipole that includes two poles connected to one another in a symmetric arrangement about an imaginary line along a plane which lies with a feed point of the antenna. Each pole includes: a terminal section connected to the feed point; a half circular resonator section behind and connected to the terminal section; a choke section having a constant cross-sectional width behind and connected to the half circular section; and an asymmetric oval resonator section behind and connected to the choke section. The rear surface has a cross bar that essentially runs coincident to the imaginary line; and a pair of tuning stubs provided on each side of the cross bar.

The substate, in some implementations, may be a printed circuit board formed of conductive front and rear surfaces isolated by a dielectric material. The substate may be 0.031 or 0.062 inches thick as a non-limiting example. The substrate can have one or include one or more mounting holes.

The half circular resonator sections may be judiciously configured around a frequency threshold, $f_h$, where, for input frequencies above the frequency threshold, the half circular resonator sections are the dominant resonators of the dipole. The frequency threshold, $f_h$, can be defined as:

$$f_h = \frac{c}{2d_s},$$

where $d_s$ is the diameter of the half circular resonator section and c is the speed of light in vacuum. The dimensions of the antenna may be such that $f_h$ is approximately 7.3 GHZ, in a non-limiting embodiment.

The asymmetric oval resonator sections may have an oblate oval shape. They are configured to ensure constructive interference of electrical currents in a depth direction thereof, normal to the substrate's front and rear surfaces. For instance, they may be formed of conjoined portions of different sized/shaped portions of two cojoined ellipses which are oriented orthogonal to each other.

The choke sections provide an electrically conductive path between the half circular sections and the asymmetric oval resonator sections. They may be configured to balance the impedance response of the antenna and preventing higher order multi-pole modes from being excited over the operational band of the antenna, and to ensure that the half circular resonator sections will have stronger electric currents compared to the asymmetric oval resonator sections for signal frequencies greater than the transition frequency, $f_t$, which is, or at least approximate to or near to, the half wavelength frequency of terminal sections. The dimensions of the antenna may be such $f_t$ is approximately 7.3 GHZ, in a non-limiting embodiment.

The terminal sections taper from the feed point to the half circular resonator sections. The taper may be a linear or exponential taper. The taper is configured to provide a constant impedance of about 135Ω.

On the rear surface, the crossbar is configured to shape the input impedance of the dipole antenna and the radiation pattern to avoid multi-pole modes. The tuning stubs are configured to adjust the impedance and radiation pattern at the transition frequency, $f_t$, caused by the choke sections. The feed point ring may be formed in the cross bar around the antenna feed point to ensure that cross bar does not contact a transmission line.

According to another embodiment, a dipole antenna comprises: a substate having a top surface and a bottom surface; a dipole formed on the top surface having symmetric poles, each pole having a half circle resonator and an oblate oval resonator that are electrically connected by a choke section; and a cross bar and capacitively-coupled stubs formed on the bottom surface which are configured to tune at the transition frequency to create a continuous impedance and gain-bandwidth. The dipole is designed to provide a frequency threshold, where the half circle resonator is the dominant resonator for input frequencies above the frequency threshold.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

I now describe a novel wideband planar dipole with approximately five times the gain-bandwidth product, defined normal to the substrate (i.e., broadside), compared to the standard wideband planar bowtie dipole. The dipole can be readily impedance matched to RF components, as its nominal input impedance lies between 100 and 150 ohms, though the higher impedance results in better performance. More, the dipole antenna can be readily machined out of commercial printed circuit board (PCB) at low cost, and the new dipole can be geometrically scaled to adjust its frequency response to higher or lower frequencies. The dipole antenna can be used for applications to include radar and communications; in fact, the bandwidth allows for the merger of multiple RF functions into one system. Such exemplary applications may include ground penetrating radar and converged-radio frequency systems (i.e., combined radar, communications, etc.). The continuous bandwidth of antenna embodiments of 1.5 GHz to 15 GHz allows it to cover popular RF bands including: Wi-Fi, 4G, 5G, etc.

In general, the novel dipole antenna design has symmetric poles with each pole having a half circle resonator and an oval resonator that are electrically connected by a straight choke section; the novel dipole permits a wideband dipole response with a transition frequency between a lower and upper frequency band. A cross bar and capacitively coupled stubs tune the dipole at the transition frequency to create a continuous impedance and gain-bandwidth. The dipole and the crossbar and stubs are formed on opposite surface or sides of a substate. The new dipole can do this because it combines different electrical length scales into a shape that functions like a frequency independent or logarithmic antenna where the small sections dominate the high frequency response, and the entire antenna dominates the low frequency response.

Figure 1A:
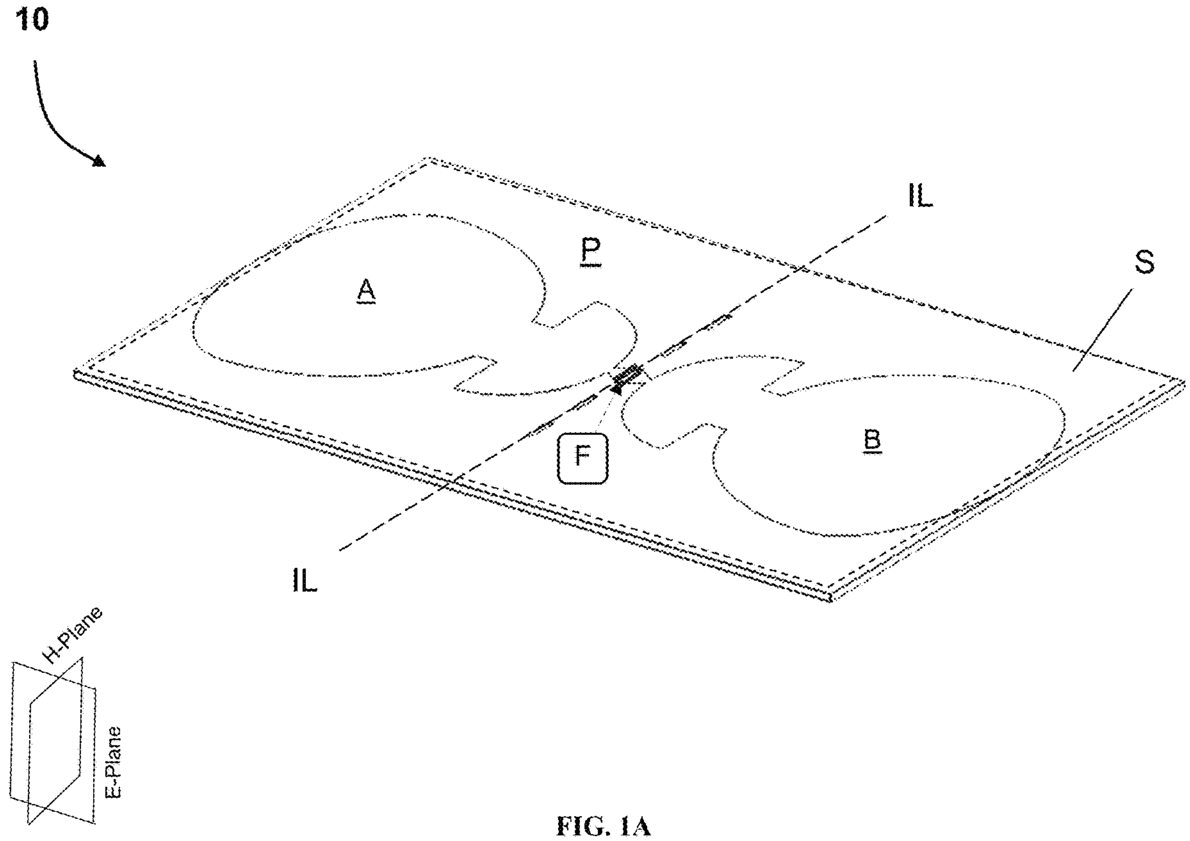
FIGS. 1A-1C depict a novel planar wideband dipole antenna according to an embodiment of the present invention.
Figure 1B:
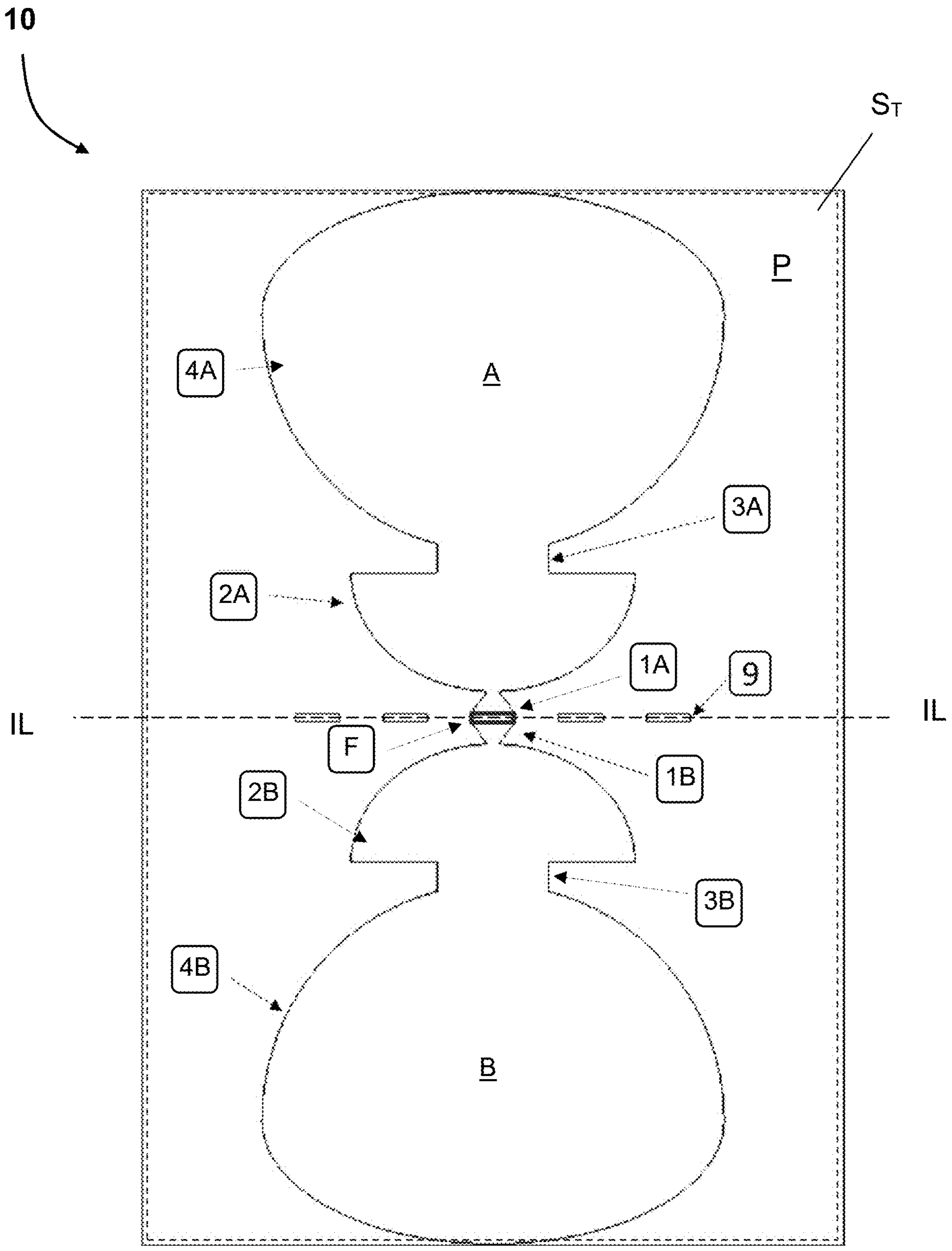
Figure 1C:
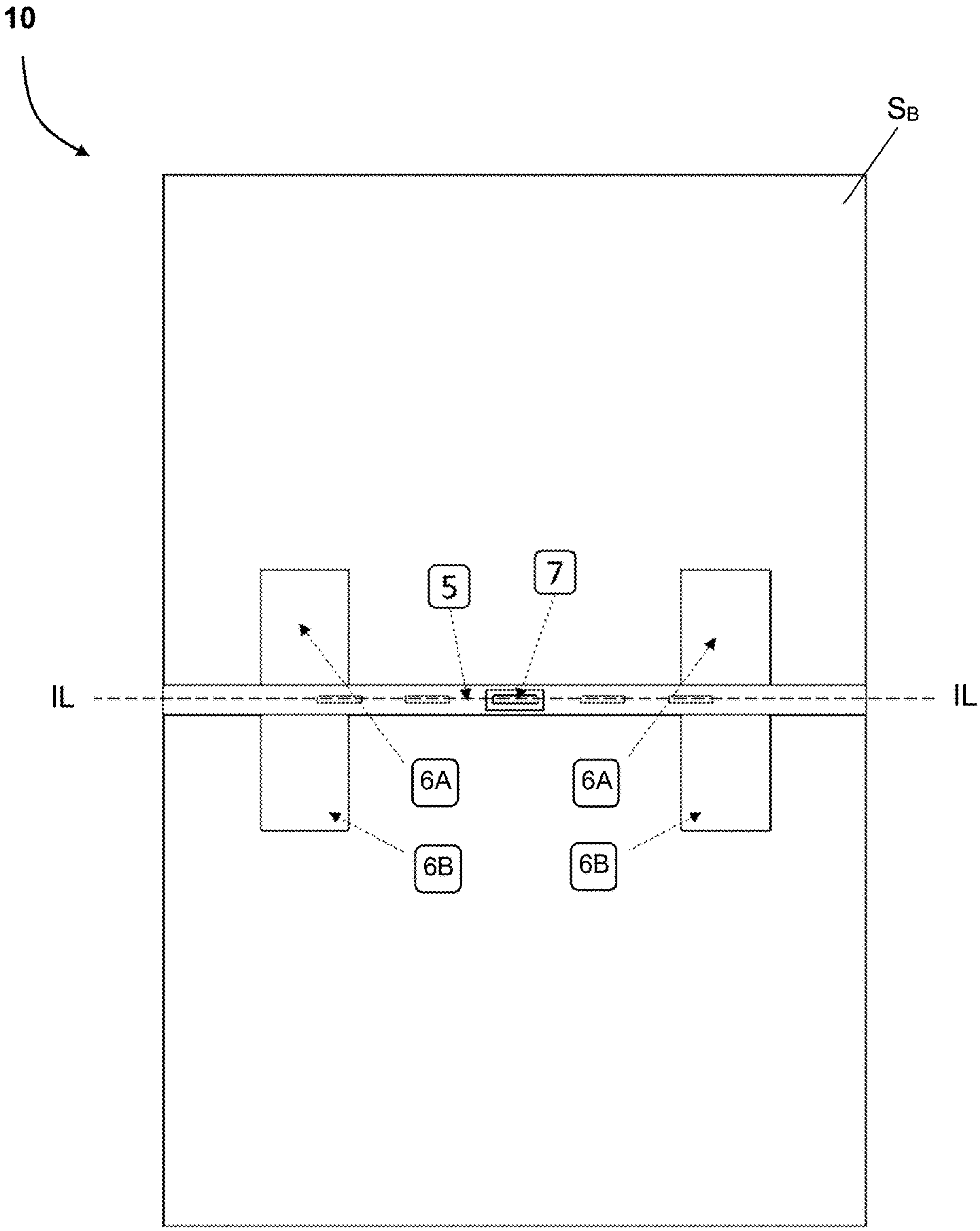

FIGS. 1A-1C depict a novel planar wideband dipole antenna 10 according to an embodiment of the present invention, in which, FIG. 1A is an isometric view of the antenna 10; FIG. 1B is a top view of the antenna 10; and FIG. 1C is a bottom view of the antenna.

The antenna 10 is formed on a substrate S having a top (front) surface $S_T$ and a bottom (rear) surface $S_B$. In the isometric view, only the top surface $S_T$ is readily visible. The substate S may be substantially flat. The substate S is relative thin to its length and width and defines a plane P. For instance, the plane P may be defined by the top surface $S_T$ (as shown, and/or the bottom surface $S_B$, or some region therebetween) of the substate S. On the plane P, there is an imaginary line IL depicted which is a line of symmetry of the antenna 10. The imaginary line IL and plane P are merely shown as dotted lines. Together, the imaginary line IL and plane P provide a relative coordinate system for the antenna 10. As shown, the substrate S (and thus the plane P) are rectangular, and the imaginary line IL bisects and is generally orthogonal to the larger sides of the plane P. However, it will be appreciated that other shapes for the substrate S are possible and/or locations for the imaginary line IL so long as the antenna 10 fits on the surfaces $S_T$, $S_B$ of the substrate S. The structure of the antenna 10 on the top and bottom surfaces are different and further shown in FIG. 1B and FIG. 1C respectively. The terms "top," "bottom," "front," and "rear," as used herein and in the claims, are relatively terminology to facilitate discussion herein. The orientation may be change from what is depicted. The bottom left corner of FIG. 1A also shows the E-plane and the H-plane in the electro-magnetic field (EMF) environment. Both planes are orthogonal to the substrate and orthogonal to each other. The E-plane is orthogonal to the IL line and orthogonal to the substrate. The H-plane is parallel to the IL line and orthogonal to the substrate.

The substrate S can be a printed circuit board (PCB) or other substrate material formed of metallic/conductive surfaces isolated by a dielectric material. They may be formed of standard PCB products in some implementations. For example, it may be formed of Rogers RT/Duroid® 5880 Laminates which is a polytetrafluoroethylene (PTFE) composite reinforced with glass microfibers with double sided ½ oz copper. Substrates with similar relative permittivity specs (i.e., 2.2-2.3) could also be used without any adjustment to the antenna size. If higher permittivity substrates are used, such as Rogers 4350b (permittivity of 3.47) or 6006 (permittivity of 6), then the antenna size might need to be reduced to keep the same performance. The reduction in size would be proportional to the square root of the increase in permittivity (i.e., doubling permittivity would require a size decrease no greater than 30%). Substrate materials that are high loss (i.e., loss tangent greater than 0.005) and/or with permittivity that is not stable at frequencies greater than 8-10 GHz, are not recommended to be used with the dipole antenna. The thickness of the substate S should be sufficient such that it provides the antenna with sufficient rigidity. As non-limiting examples, the substrate S may be 0.031 or 0.062 inches thick which are standard PCB thicknesses.

This dipole antenna 10 makes use of certain features of my earlier design for a monopole antenna which is disclosed in following paper: S. A. McCormick, "Planar UWB monopole with improved pattern shape," 2018 *United States National Committee of URSI National Radio Science Meeting* (*USNC-URSI NRSM*), Boulder, CO, USA, 2018, pp. 1-2, herein incorporated by reference in its entirety. This paper disclosed a monopole antenna, rather than a dipole as described herein, making it distinctly a different kind of antenna. Prior to conception of the novel dipole antenna 10, I had assumed that the shape of my earlier monopole radiating element would cause conflicting modes to form in a dipole configuration; these conflicting modes would produce an undesirable multi-mode radiation pattern. To address this problem, I provide the novel dipole with a backside having a cross bar and tuning tabs to support the dipole configuration; the backside is therefore key to its function. The shape of the dipole, cross bar, and tuning tabs require careful and technically informed optimization to suppress the multi-mode radiation pattern. Also, the terminal sections 1A, 1B have to be shaped correctly to ensure that the impedance response does not oscillate to much versus the input frequency; the dimensions of 1A, 1B are not readily obvious a-priori.

On the top (front) surface $S_T$ of the substate S, as shown in FIG. 1B, the dipole of the antenna 10 is formed of poles A and B. The poles A and B are generally symmetric to one another about imaginary line IL as further explained. For ease of explanation, the subscripts A and B refer to respective elements of the poles A and B, respectively. The poles A and B generally include terminal sections 1A, 1B which connect to a feed point of the antenna; half circular resonator sections 2A, 2B behind and connected to the terminal section; choke sections 3A, 3B having a constant cross-sectional width behind and connected to the half circular resonator sections; and asymmetric oval resonator sections 4A, 4B behind and connected to the choke sections. The asymmetric oval resonator sections 4A, 4B are larger in areal size than the half circular resonator sections 2A, 2B.

The terminal sections 1A, 1B connect to a feed point F for electrical signals for the antenna 10. The dipole antenna can be used to transmit and/or receive signals as certain RF applications may require. For instance, it can receive an electrical signal at the feed point F which the dipole produces a corresponding radio frequency. Similarly, the dipole can receive a RF frequency for which a corresponding electrical signal is output at the feed point F. The terminal sections 1A, 1B are constructed to generally taper from the feed point F input to half circular resonator sections 2A, 2B. The taper is necessary to shape the input impedance of the antenna to be smooth and have a nominally constant impedance, e.g., of about 135Ω. A linear taper as shown could be used, for instance. Although an exponential taper might be a suitable alternative for the linear taper as long as the taper ensures that the feed point width similarly decreases, from say 0.125 inches to 0.032 inches over a distance of 0.066 inches, as shown, for instance, in FIG. 2C.

Next, the half circular resonator sections 2A, 2B follow. They each have a substantially half circle (180°) shape to keep the edge currents balanced so that the radiation pattern is peaked at broadside to the substrate. If it is wider in shape, then this could cause the edge currents to destructively contribute to the radiation pattern; if the shape is narrower, then the bandwidth is truncated. The half circle is thus the good or optimal shape for this antenna. This resonator piece has a strong electromagnetic response at high frequencies and becomes the dominant radiator when the frequency of the input signal exceeds a frequency threshold, $f_h$. The parameter, $f_h$, may be defined as the frequency at which the small circle diameter, $d_s$, is a half wavelength, that is, $$f_h = \frac{c}{2d_s},$$

assuming that the variable, c, is the speed of light in vacuum.

The choke sections 3A, 3B link the half circular resonator sections 2A, 2B with the asymmetric oval resonator sections 4A, 4B and provide an electrically conductive path therebetween. They have a rectangular shape with constant width and are designed to provide a “choke like” response. That is, they create a restriction or choke for the electric current at intermediate frequencies, $f_i$, e.g., ranging from about 5 to about 7.5 GHz, to pass through. This ensures that the half circular resonator sections 2A, 2B will have stronger electric currents compared to the asymmetric oval resonator sections 4A, 4B for signal frequencies greater than the transition frequency $f_t$. The transition frequency $f_t$ is, or at least approximate to or near to, the half wavelength frequency of terminal sections 1A, 1B, which can be approximately 7.3 GHZ, for instance, for the antenna 10A shown in FIG. 2A. Unlike the shapes the half circular resonator sections 2A, 2B and the asymmetric oval resonator sections 4A, 4B, the rectangular shape of the choke sections 3A, 3B balances the impedance response of the antenna and preventing higher order multi-pole modes from being excited over the operation band (multi-pole modes cause radiation patterns that do not peak at broadside and are narrowband).

And lastly, the asymmetric oval resonator sections 4A, 4B may have an overall oblate oval shape. They are judiciously designed to ensure constructive interference of electrical currents in the depth direction (i.e., normal to the substrate's top and bottom surfaces) of the resonator sections 4A, 4B. For example, they can be formed of cojoined portions of different sized/shaped portions of ovals. They are asymmetric meaning that if one were to separate one side of the resonator section from the rest of the antenna, one would find that the removed side has a relative orientation different than the remaining antenna. As further depicted in FIG. 2A, the resonator sections 4A, 4B can be formed of portions (e.g., halves) of two cojoined ellipses which are oriented orthogonal (90°) from each other. That is, their respective major axis and minor axes are shared.

These resonator sections 4A, 4B are configured to have a strong electromagnetic response at frequencies below $f_h$, e.g., approximately 7.3 GHZ, and combined with the half circular resonator sections 2A, 2B, set the lowest frequency response of the entire antenna. The asymmetric shape with a smooth curve is required to shape the antenna impedance to be smooth versus frequency for below about 7.3 GHZ.

On the bottom (rear) surface $S_B$ of the substate S, as shown in FIG. 1C, a cross bar 5, tuning stubs 6 and feed point ring 7 are formed. The cross bar 5 runs orthogonal to elements 1-4 of the poles A and B formed on the top surface $S_T$ but is formed on the backside of the substrate. It is coincident (and thus parallel) to the imaginary line IL. One way to make the antenna is to mill the cross bar 5 out of PCB board. An alternative method would be additive manufacturing using conductive material (e.g., paste) on a 3D printed substrate; the antenna could be made conformal in this case. The cross bar 5 is configured to help shape the input impedance of the antenna and the radiation pattern to avoid multi-pole modes.

The tuning stubs 6A, 6B are configured to help to adjust the impedance and radiation pattern at the transition frequency caused by the choke sections 3A, 3B. The width and length of the tuning stubs 6A, 6B are sized to balance the modifications to the input impedance and the radiation pattern as there is a tradeoff between optimizing one over the other. By adjustment, it is meant that the distance between the tuning stubs 6A, 6B and the half circular resonators 2A, 2B is designed to be optional, i.e., neither too short nor too large. If the distance is too short, the antenna impedance response will exhibit an antiresonance, thereby creating a notch in the bandwidth, and if the distance is too large, the antenna pattern will split and no longer point in the broadside to substrate direction. If the tuning stubs 6A, 6B widths are too narrow and the lengths too short, they will not efficiently couple to the half circular resonators 2A, 2B which allows the radiation pattern to split, and if they are too wide or too long, they will over couple causing a notch in the impedance bandwidth. Multiple tabs, while possible, would introduce multiple resonances and anti-resonances that would work against the performance of the dipole by creating notches in the impedance bandwidth and splits in the radiation pattern; thus, I recommend using only two tabs.

Elements 1-6 are conductive and may be defined by etching away conductive portions of a standard dielectric substate with copper coatings. These conductive elements may have the same thickness. As one non-limiting example, their conductive portions may be 0.00157 inches thick (40 microns).

The feed point ring 7 could be of either side of the antenna. Although, I believe it may be easier to implement on the rear side as shown. For instance, as shown, the feed point F may be at or near the bottom (rear) surface $S_B$ and the substrate S may further comprise a feed point ring 7 formed in the cross bar 5 connecting to the feed point F. The feed point ring 7 can be milled into substate S around the antenna feed point to ensure that the cross bar 5 does not contact any PCB transmission line. Isolating the cross bar 5 from any transmission line is necessary to ensure that a smooth impedance transition is possible.

One or more mounting hole(s) 9 can be drilling through, milled or otherwise formed in the substrate S to be used mounting points for a dielectric substrate with a PCB transmission line. There is flexibility in how one can securely fix the PCB transmission line to the antenna. The hole(s) 9 may be square, rounded, oval, circular pegs, or chamfered, for instance. Five of such holes 9 are depicted along the imaginary line IL in the figures. However, there could be fewer, say 1 or 3. A single hole located in the center, i.e., at convergence of both the terminal sections 1A, 1B, may be sufficient to also allow for the feed of the antenna. Additional mounting holes might be located at other locations than along the imaginary line IL.

Figure 2A:
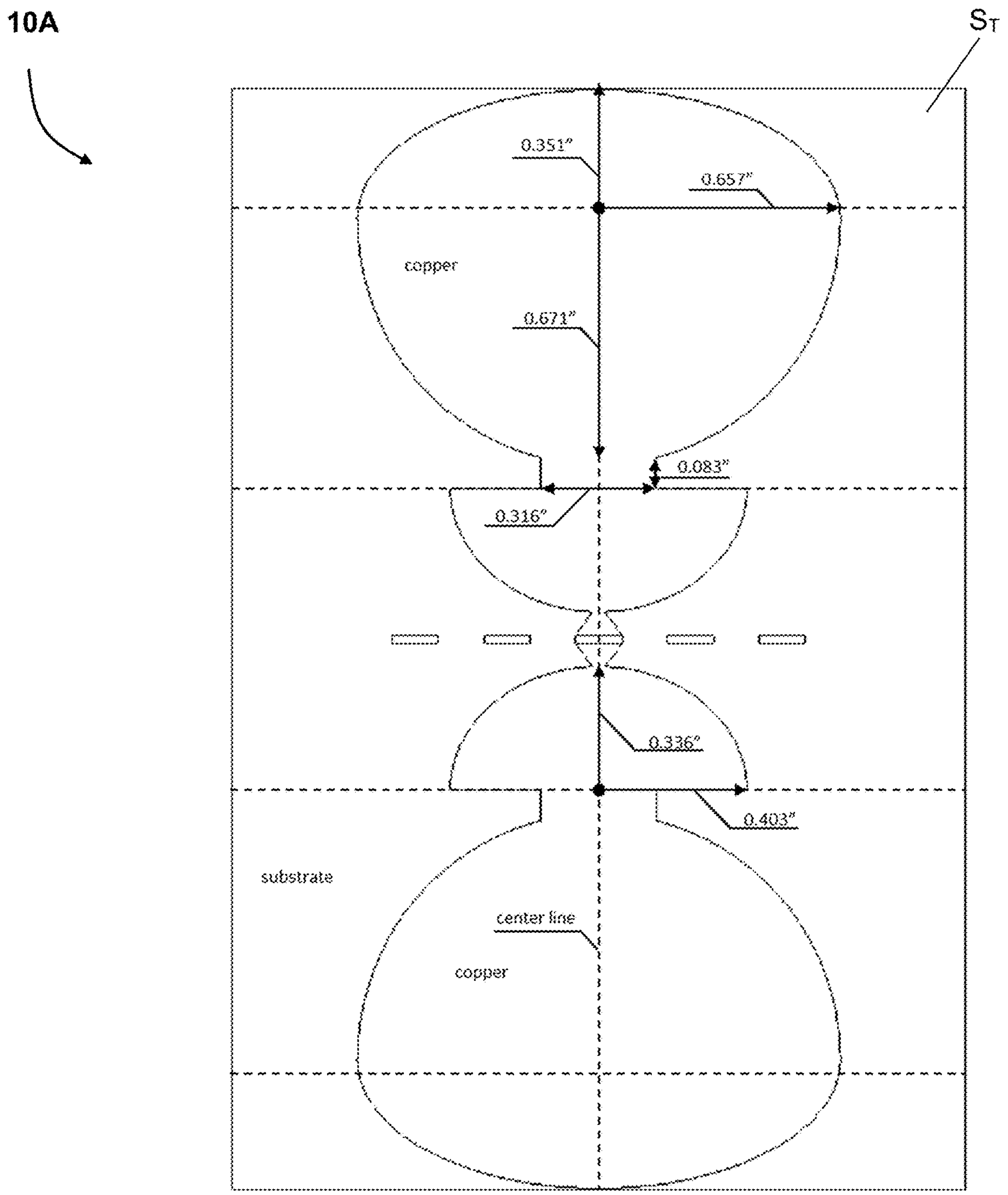
FIGS. 2A-2F provide dimensions for a dipole antenna according to one non-limiting embodiment the invention.
Figure 2B:
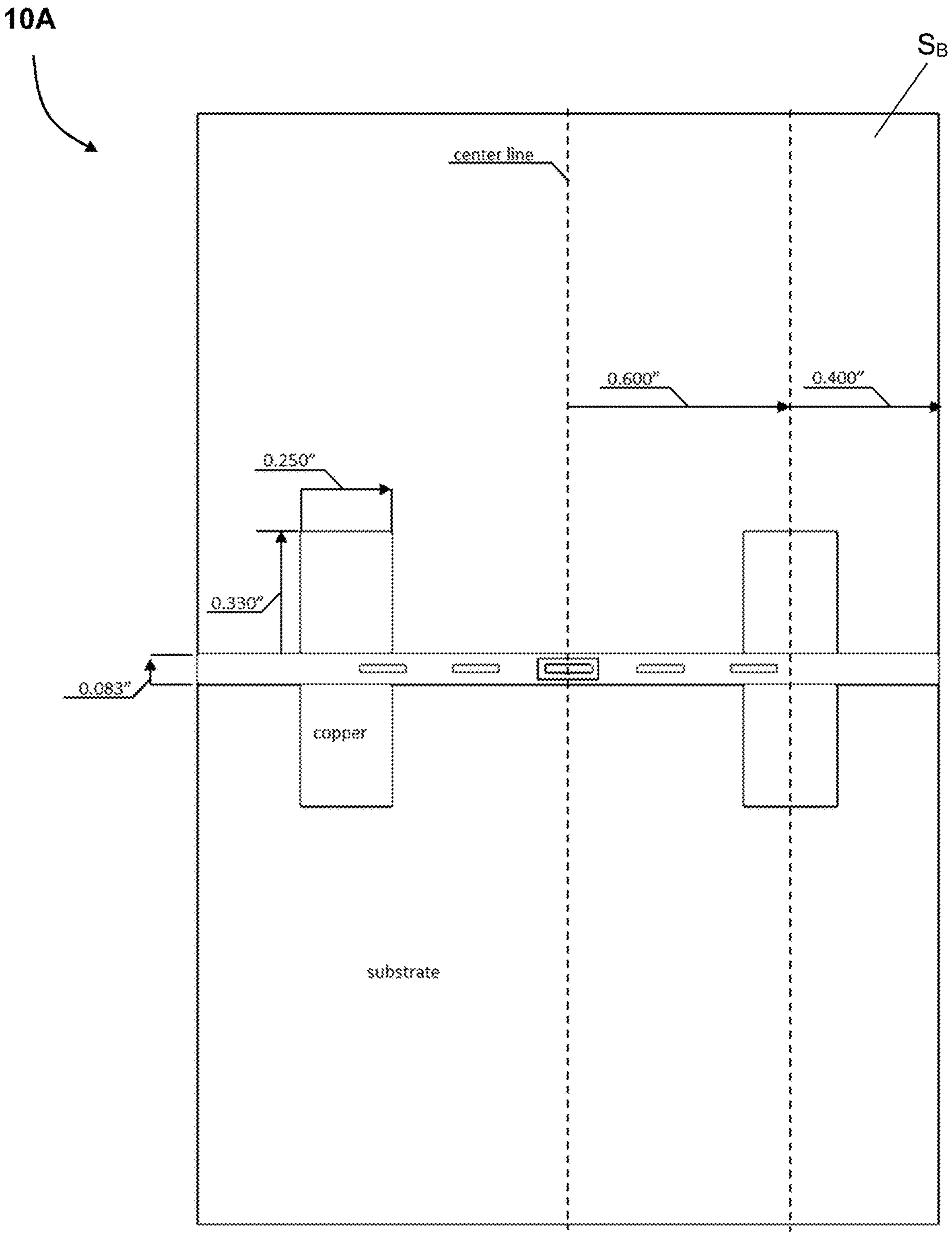
Figure 2C:
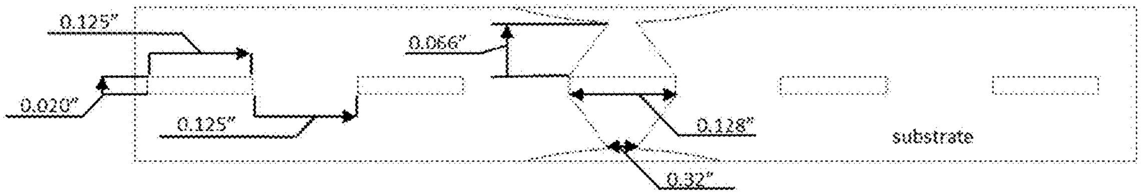
Figure 2D:
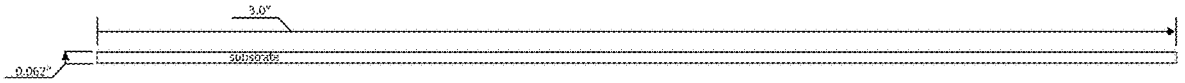
Figure 2E:
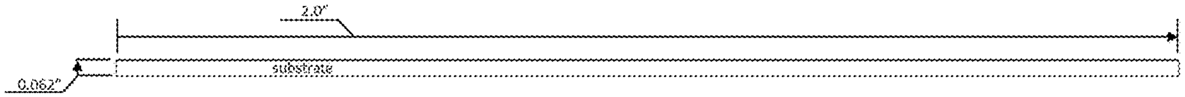
Figure 2F:
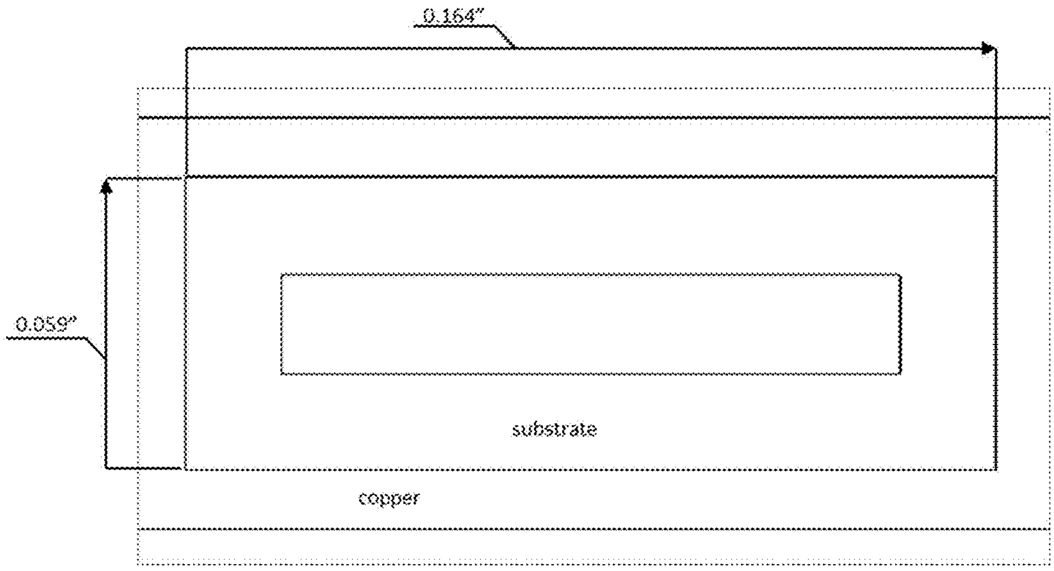

FIGS. 2A-2F provide dimensions for a dipole antenna 10A according to one non-limiting embodiment the invention. The dimension unit is inches. FIG. 2A is a top view of the top (front) surface $S_T$ of the substrate S; FIG. 2B is a bottom view of the bottom (rear) surface $S_B$ of the substrate S; FIG. 2C is a zoomed in top view of the feed region; FIG. 2D is a front side view; FIG. 2E is a lateral side view; and FIG. 2F is a zoomed in back view. While not labelled herein, it should be quite apparent what the dimensioned elements are based on what is depicted in FIGS. 1A-1C. The antenna 10A, of course, can readily be scaled to other dimensions in other embodiments. For instance, one can start with linear scaling where the scale factor is the inverse ratio of any one dimension and the desired dimension. The scale factor is then applied to all dimensions; however, it is typically not applied to the substrate thickness and the terminals so that the impedance match to the feed point remains the same.

Figure 3A:
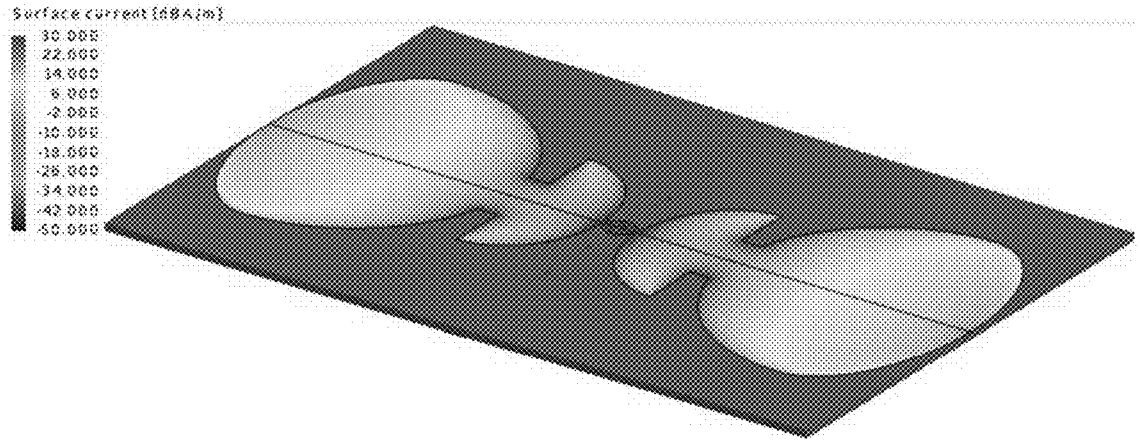
FIGS. 3A-3D are simulations of surface electric current distributions at 1.8 GHZ, 7.2 GHz, 9 GHZ, and 14.4 GHZ, respectively, which demonstrate the function of the half circular sections, the choke sections and the asymmetric oval resonator sections of the novel antenna.
Figure 3B:
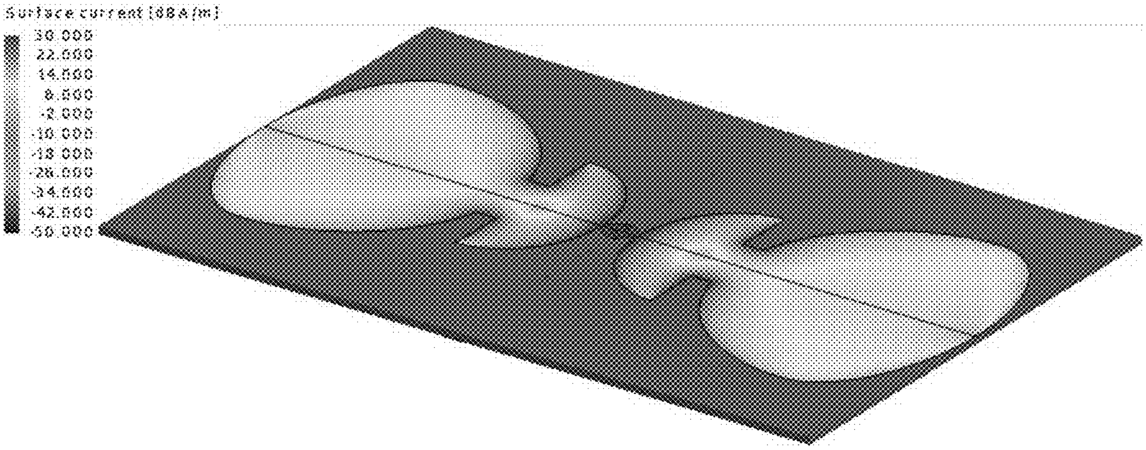
Figure 3C:
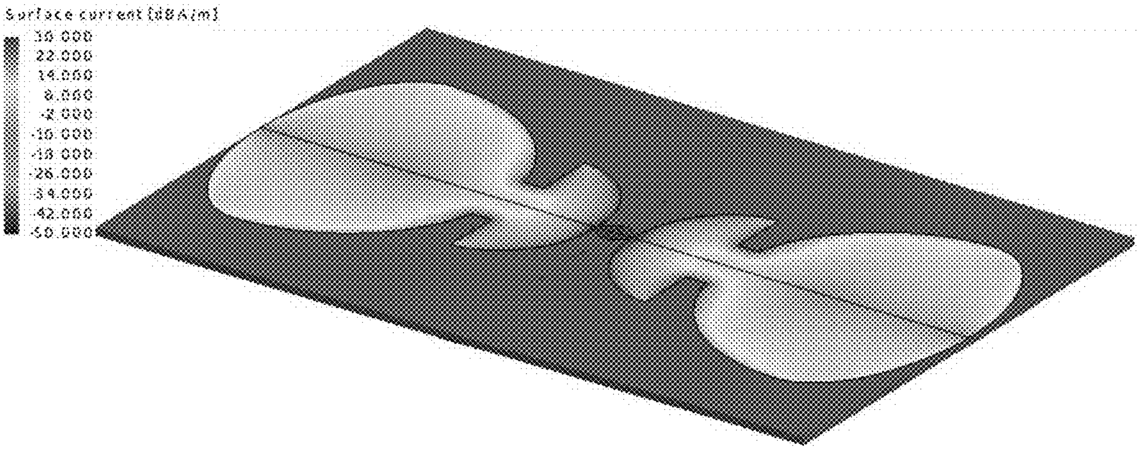
Figure 3D:
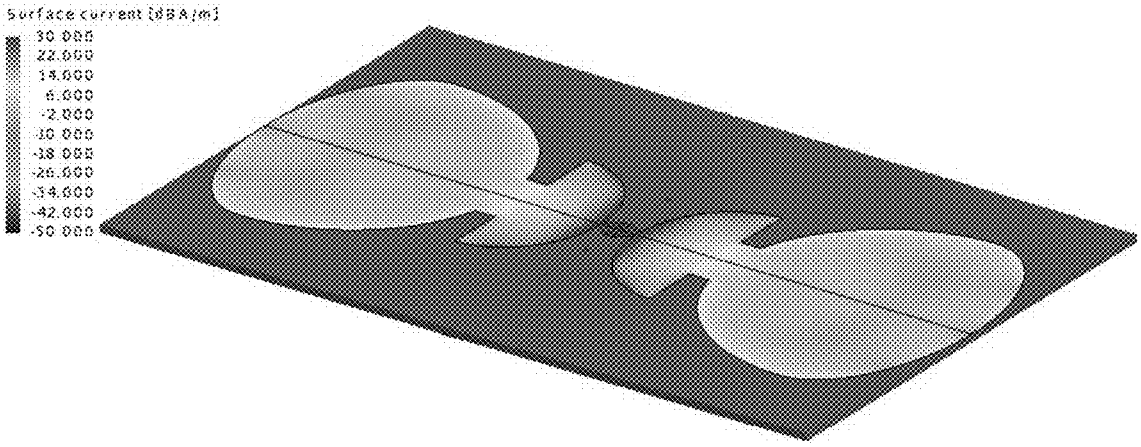

Now, I will discuss operational characteristics for the antenna 10A. FIGS. 3A-3D are simulations of surface electric current distributions demonstrating the function of the half circular sections 2A, 2B, the choke sections 3A, 3B and the asymmetric oval resonator sections 4A, 4B. More particularly, FIG. 3A shows, at about 1.8 GHZ, all three of these sections are strong. FIG. 3B shows, at around 7.2 GHZ, the choke sections 3A, 3B create a transition to the half circular resonator sections 2A, 2B only. FIG. 3C shows, at around 9 GHZ, the half circular resonator sections 2A, 2B begin to dominate. And FIG. 3D shows, at about 14.4 GHZ, the half circular resonator sections 2A, 2B dominates.

Figure 4A:
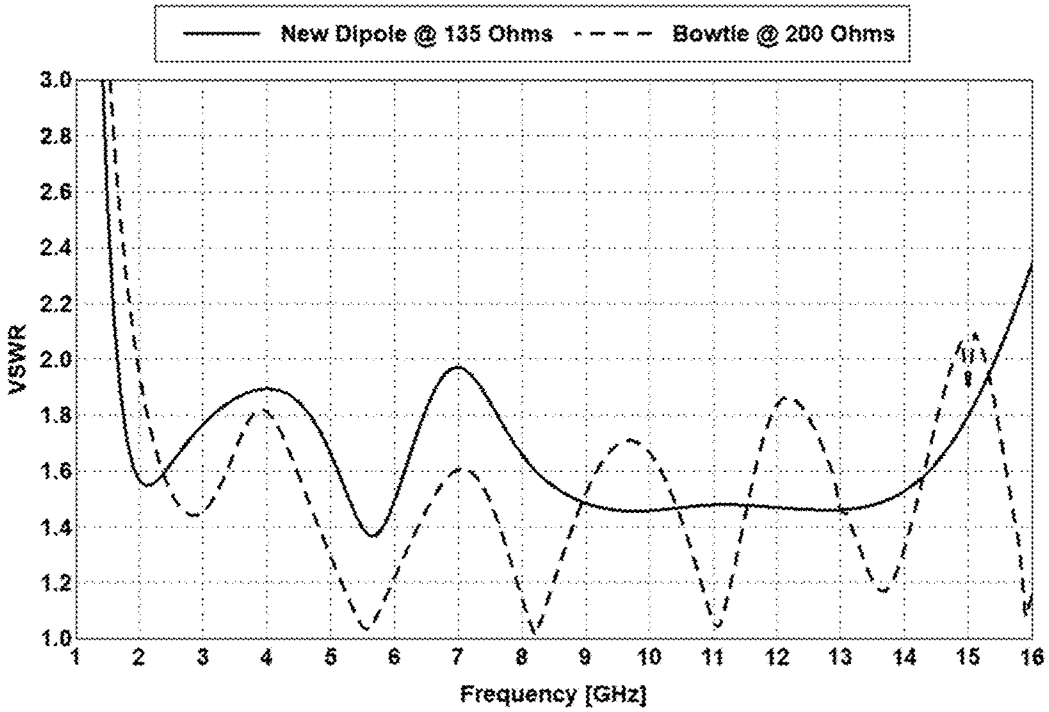
FIGS. 4A-4B show simulated data comparing the novel dipole and the standard bowtie from 1.5 GHz to 15.5 GHz.
Figure 4B:
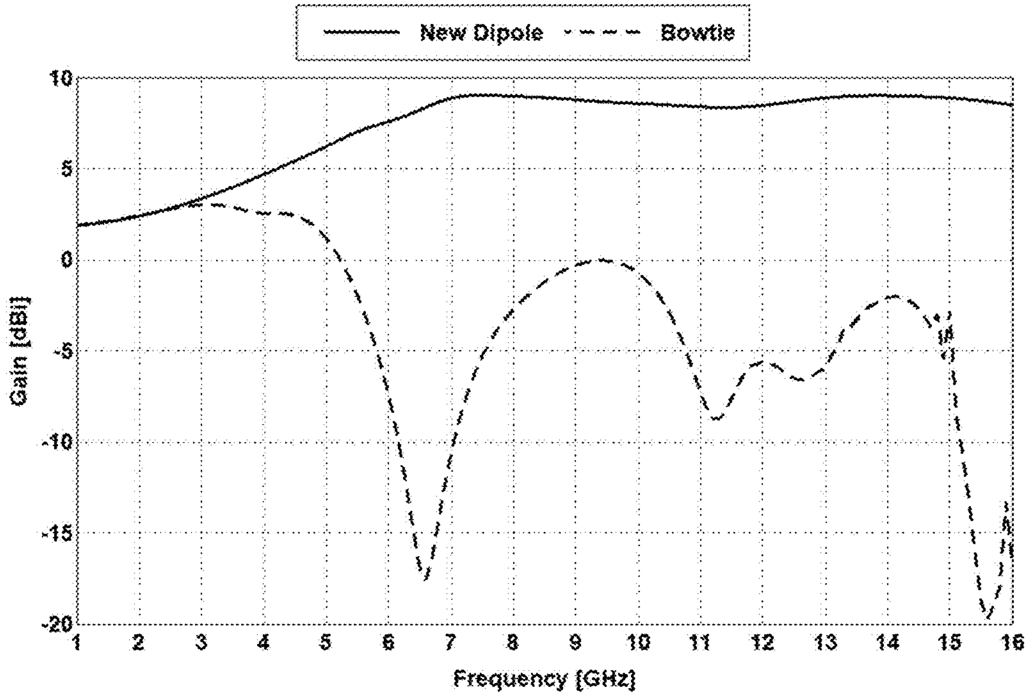

Data demonstrates the novel dipole antenna can exceed the gain-bandwidth of the state-of-the-art bowtie by approximately 5 times, that is, its gain-bandwidth is 10:1 versus the standard bowtie gain-bandwidth of 2:1 at broadside. FIGS. 4A-4B show simulated data comparing the novel dipole and the standard bowtie. FIG. 4A shows simulated VSWR for the new dipole and the standard bowtie of same length; the new dipole has a VSWR less than 2.0 from 1.5 GHz to 15.5 GHz. FIG. 4B shows simulated broadside gain for the new dipole and equivalent length bowtie where the new dipole is clearly shown to have up to 5 times the gain bandwidth since it remains positive over the simulation domain. The state-of-the-art bowtie type dipoles have impedance bandwidth ratios of 4:1, but the gain at broadside rolls off after the first decade (2:1) of bandwidth. The new wideband planar dipole combines a high and low frequency feature with the cross bar 5 and capacitively coupled tuning stubs 6 to ensure that the fundamental dipole mode remains dominant as the signal frequency increases; this is how the new wideband dipole can exceed the state-of-the-art.

Figure 5:
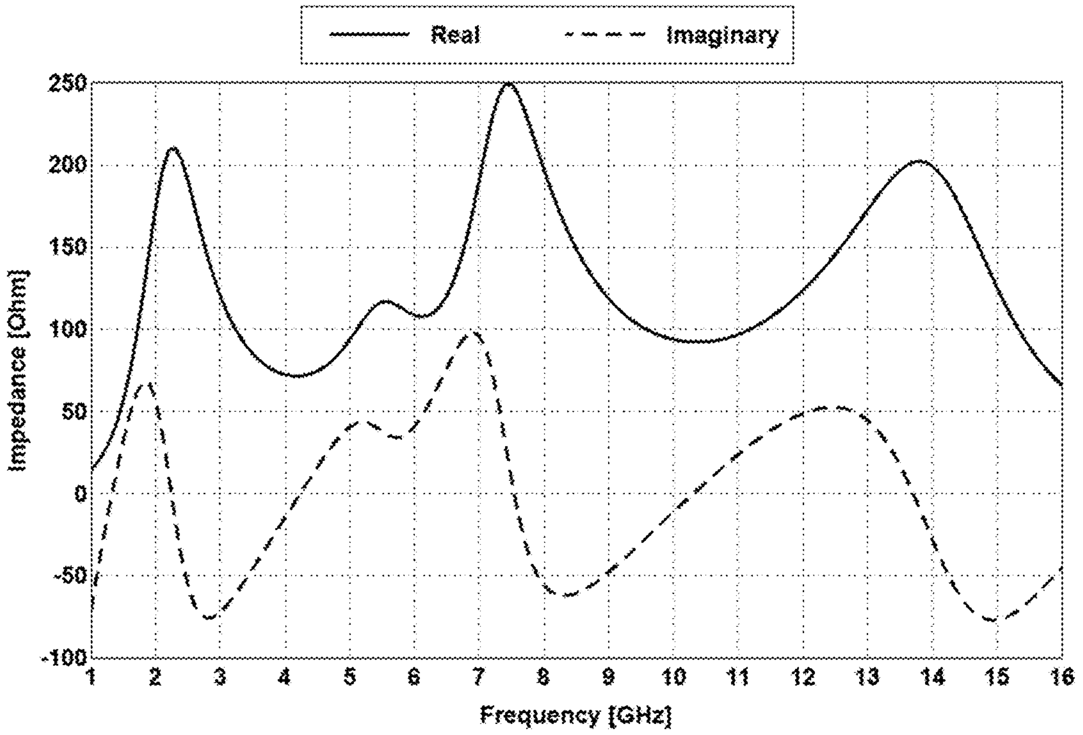
FIG. 5 shows simulated new dipole input impedance.

FIG. 5 shows simulated new dipole input impedance. The real part remains greater than the imaginary component for the simulation domain allowing for a good VSWR for a reference impedance of approximately 135 Ohm. This resistance value provides the optimal VSWR.

Figure 6A:
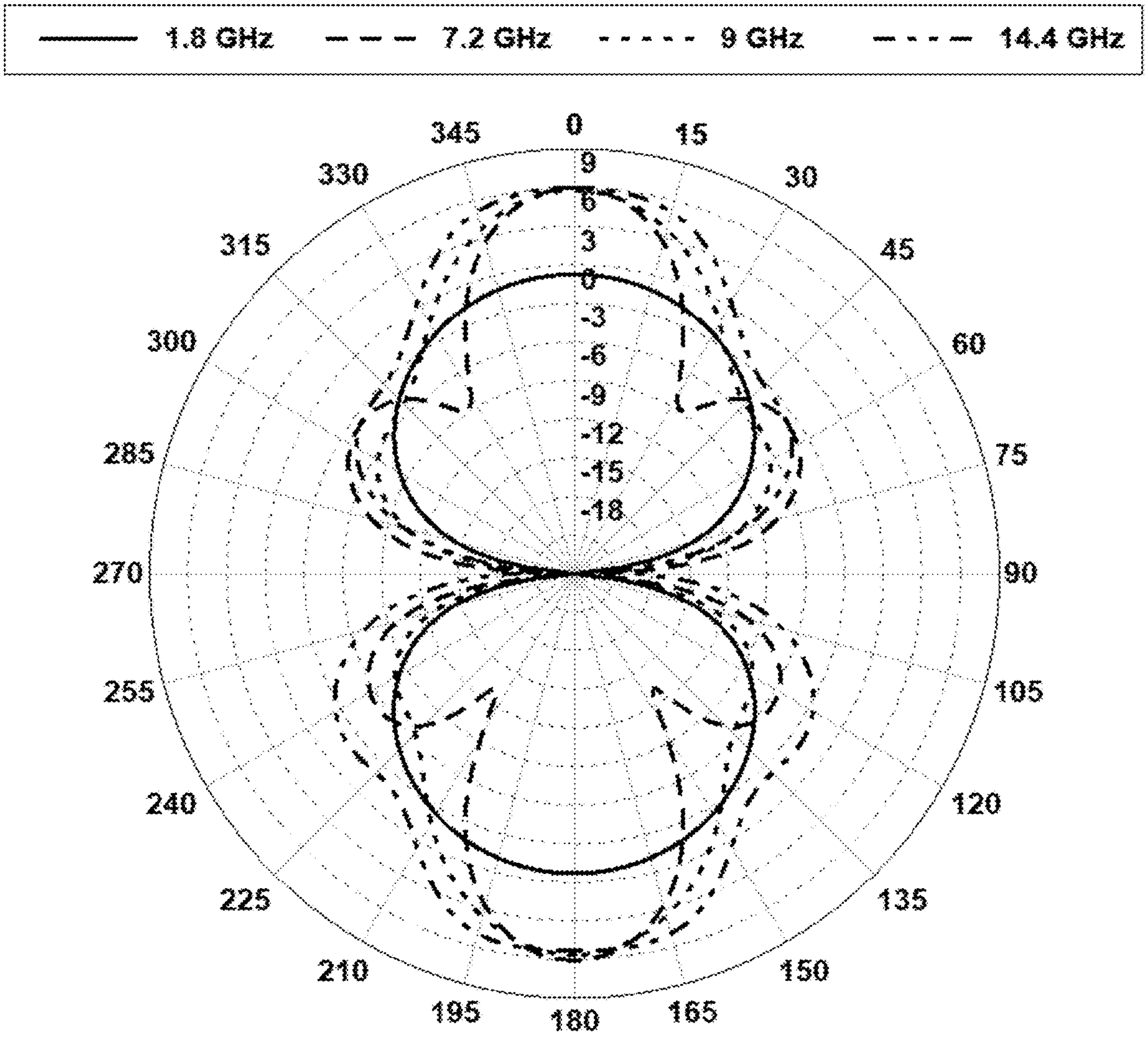
FIGS. 6A-6B show the gain patterns in the E-plane and H-plane, respectively, at 1.8 GHz, 7.2 GHZ, 9 GHZ, and 14.4 GHz.
Figure 6B:
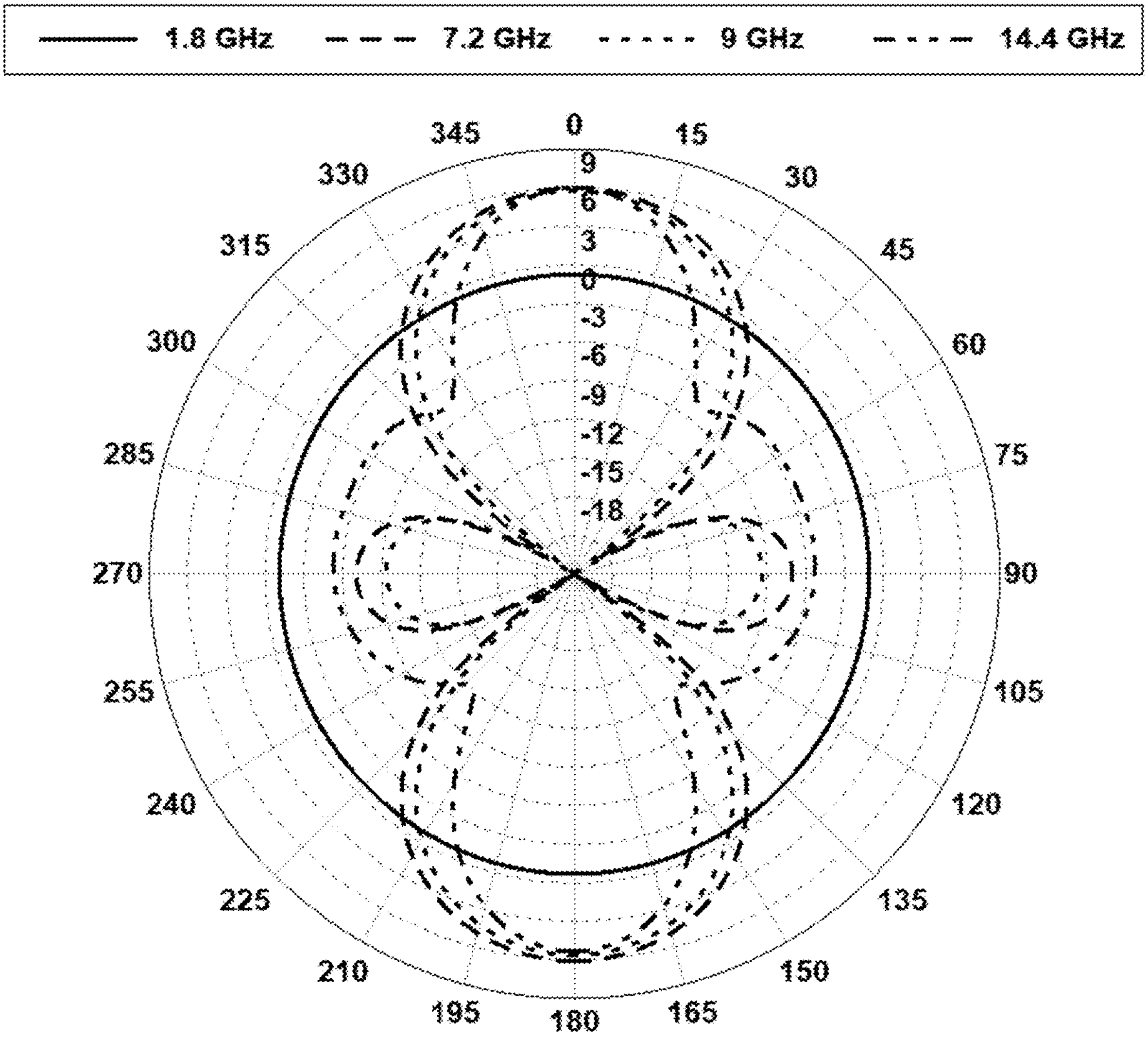
Figure 7A:
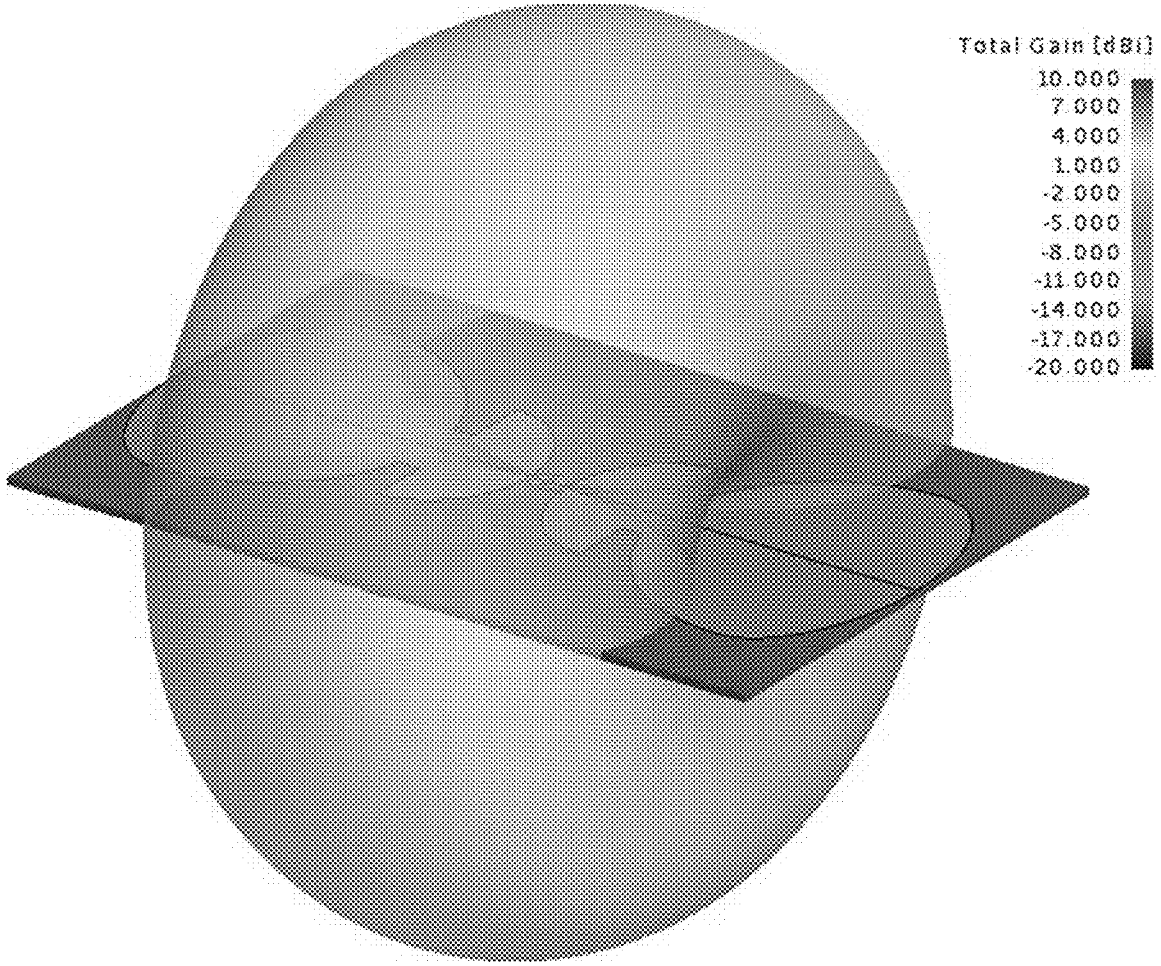
FIGS. 7A-7D show simulated three-dimensional total gain patterns for the new dipole at 1.8 GHZ, 7.2 GHz, 9 GHZ, and 14.4 GHz, respectively.
Figure 7B:
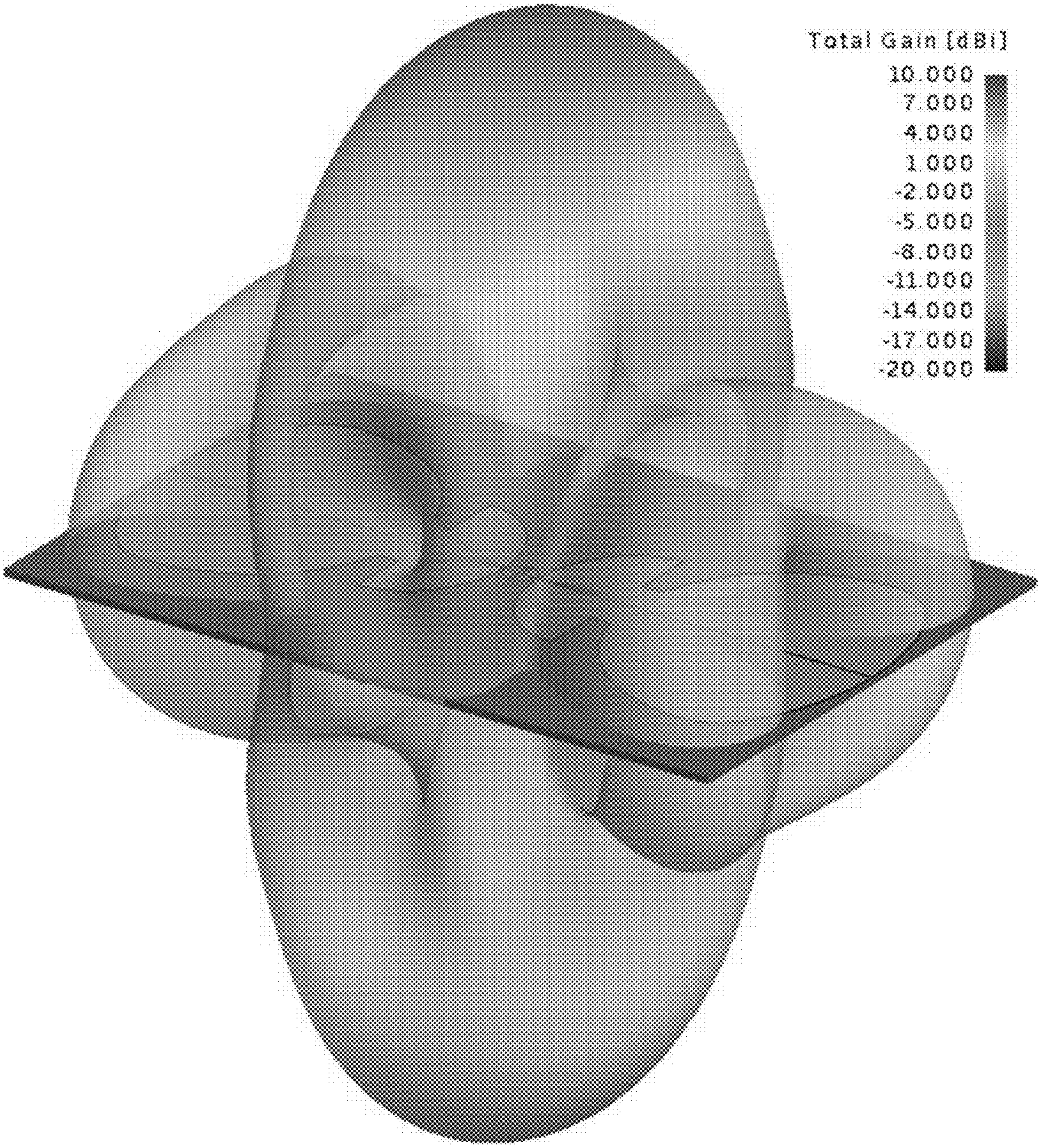
Figure 7C:
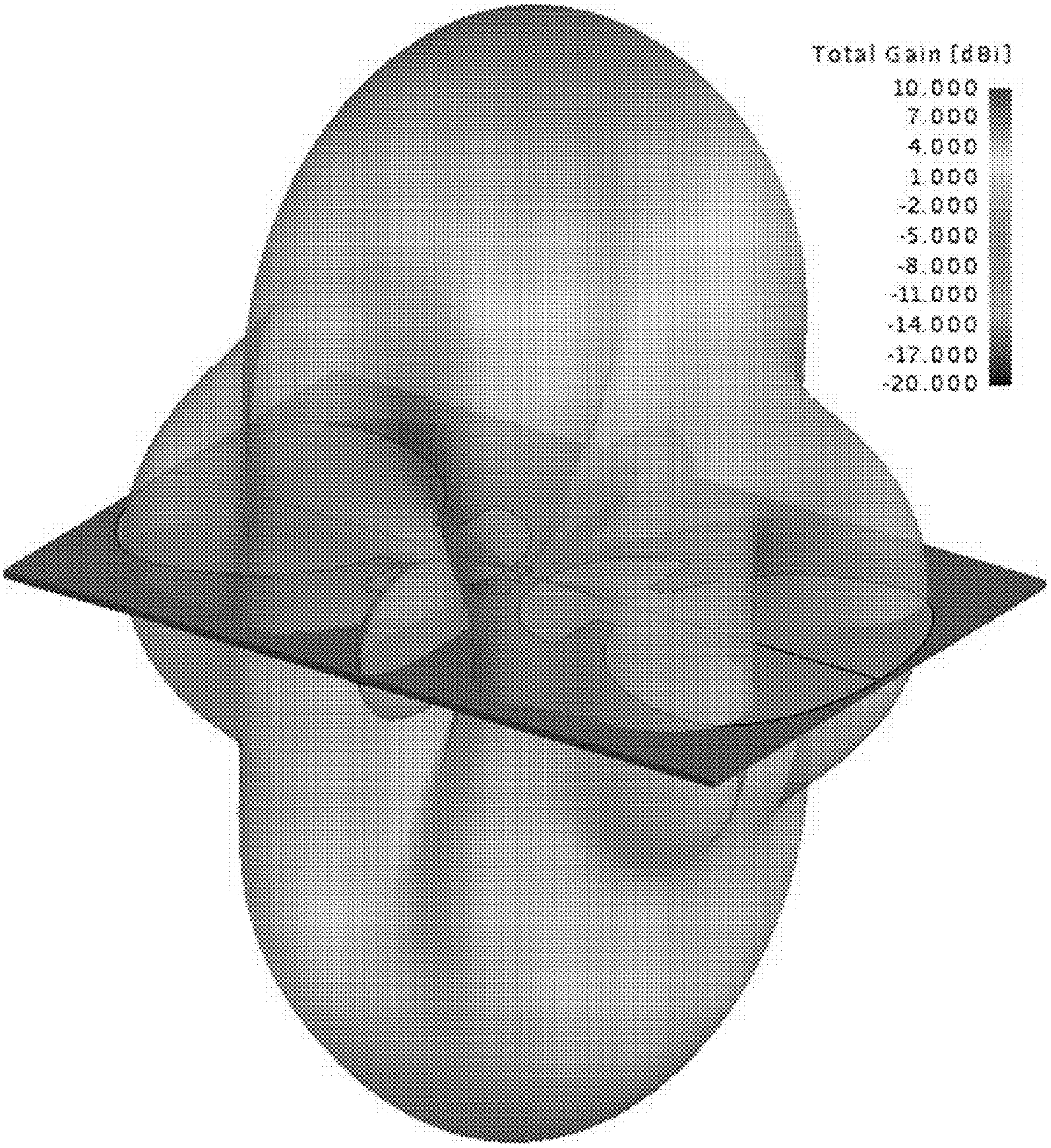
Figure 7D:
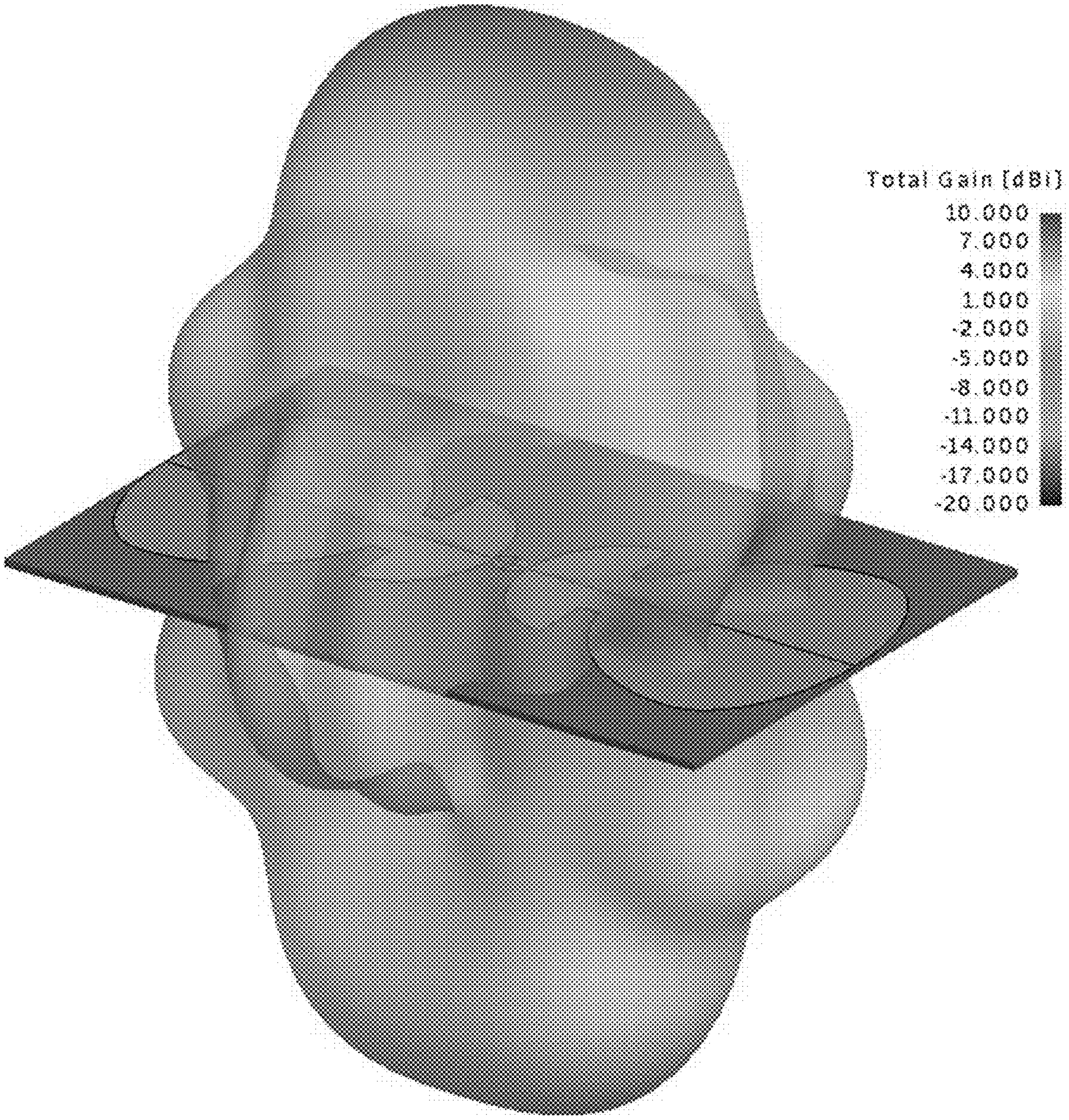

FIGS. 6A-6B show the gain pattern in the E-plane and H-plane, respectively, at 1.8 GHz, 7.2 GHz, 9 GHz, and 14.4 GHz. Values are in dBi units.

FIGS. 7A-7D show simulated three-dimensional total gain patterns for the new dipole at 1.8 GHz, 7.2 GHZ, 9 GHZ, and 14.4 GHz, respectively; the patterns are omnidirectional at low frequencies and bidirectional at high frequencies.

The novel dipole antenna can be for applications to include radar and communications; in fact, the bandwidth allows for the merger of multiple RF functions into one system. The size of the antenna allows it to be readily integrated onto small-payload platforms. This antenna may also find potential use in "internet of things" applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

I claim:

1. A high gain planar dipole antenna with decade gain-bandwidth comprising:

a substate having a front surface and a rear surface, wherein the front surface comprising a dipole includes two poles which are electrically connected to one another at a feed point of the dipole antenna in a symmetric arrangement about an imaginary line along a plane which lies with the feed point of the dipole antenna, each pole comprising:

a terminal section connected to the feed point;

a half circular resonator section having a substantially half circle shape behind and connected to the terminal section;

a choke section having a constant cross-sectional width behind and connected to the half circular resonator section; and an asymmetric oval resonator section behind and connected to the choke section; and the rear surface comprising:

a cross bar which runs coincident to the imaginary line; and a pair of tuning stubs provided on each side of the cross bar.

2. The dipole antenna of claim 1, wherein the substate is a printed circuit board formed of conductive front and rear surfaces isolated by a dielectric material.

3. The dipole antenna of claim 2, wherein the substate is 0.031 or 0.062 inches thick.

4. The dipole antenna of claim 1, wherein the half circular resonator sections are configured around a frequency threshold ($f_h$) so that for frequencies above the frequency threshold ($f_h$) the half circular resonator sections are the dominant resonators of the dipole.

5. The dipole antenna of claim 4, wherein the frequency threshold ($f_h$) is defined as:

$$f_h = \frac{c}{2d_s},$$

where ($d_s$) is the diameter of the half circular resonator section and (c) is the speed of light in vacuum.

6. The dipole antenna of claim 5, wherein the frequency threshold ($f_h$) is approximately 7.3 GHZ.

7. The dipole antenna of claim 1, wherein the asymmetric oval resonator sections have an oblate oval shape.

8. The dipole antenna of claim 1, wherein the asymmetric oval resonator sections are configured to ensure constructive interference of electrical currents in a depth direction thereof, normal to the substate's front and rear surfaces.

9. The dipole antenna of claim 8, wherein the asymmetric oval resonator sections are formed of conjoined portions of two ellipses, wherein the two ellipses are orthogonal to each other and the conjoined portions have different sizes or shapes.

10. The dipole antenna of claim 1, wherein the choke sections provide an electrically conductive path between the half circular sections and the asymmetric oval resonator sections.

11. The dipole antenna of claim 10, wherein the choke sections are configured to balance the impedance response of the antenna and to prevent higher order multi-pole modes from being excited over the operational band of the antenna, and to ensure that the half circular resonator sections will have stronger electric currents compared to the asymmetric oval resonator sections for signal frequencies greater than a transition frequency ($f_t$) which is, or at least approximate to or near to, a half wavelength frequency of the terminal sections.

12. The dipole antenna of claim 11, and wherein the transition frequency ($f_t$) is approximately 7.3 GHz.

13. The dipole antenna of claim 1, wherein the terminal sections taper from the feed point to the half circular resonator sections.

14. The dipole antenna of claim 13, wherein the taper is a linear or exponential taper.

15. The dipole antenna of claim 14, wherein the taper is configured to provide a constant impedance of about 135 Ω.

16. The dipole antenna of claim 1, wherein the cross bar is configured to influence an input impedance and a radiation pattern of the dipole antenna to avoid multi-pole modes.

17. The dipole antenna of claim 11, wherein the tuning stubs are configured to adjust the input impedance and radiation pattern of the dipole antenna at the transition frequency ($f_t$) caused by the choke sections.

18. The dipole antenna of claim 1, wherein a feed point ring is formed in the cross bar around the antenna feed point to ensure that the cross bar does not contact a transmission line.

19. A dipole antenna comprising:

a substrate having a top surface and a bottom surface;

a dipole formed on the top surface having two symmetric poles, each pole having a half circle resonator having a substantially half circle shape and an oblate oval resonator that are electrically connected by a choke section; and a cross bar and tuning stubs formed on the bottom surface which are configured to tune at a transition frequency to create a continuous impedance and gain-bandwidth.

20. The dipole antenna of claim 19, wherein the dipole is designed to provide a frequency threshold, where the half circle resonators are the dominant resonators for input frequencies above the frequency threshold.

* * * * *